Nov. 18, 1958 L. H. GERNERT 2,861,134

MAGNETIC TRANSDUCING HEAD WITH MOUNTING AND ADJUSTMENT MEANS

Filed Oct. 29, 1954 4 Sheets-Sheet 1

INVENTOR
LAWRENCE H. GERNERT
BY William S. Glover
AGENT

INVENTOR
LAWRENCE H. GERNERT
BY William L. Glover
AGENT

Nov. 18, 1958 L. H. GERNERT 2,861,134
MAGNETIC TRANSDUCING HEAD WITH MOUNTING AND ADJUSTMENT MEANS
Filed Oct. 29, 1954 4 Sheets-Sheet 3

INVENTOR
LAWRENCE H. GERNERT
BY William L. Glover
AGENT

Nov. 18, 1958

L. H. GERNERT

MAGNETIC TRANSDUCING HEAD WITH MOUNTING AND ADJUSTMENT MEANS 2,861,134

Filed Oct. 29, 1954

4 Sheets-Sheet 4

INVENTOR

LAWRENCE H. GERNERT

BY William L. Glover

AGENT

United States Patent Office 2,861,134
Patented Nov. 18, 1958

2,861,134

MAGNETIC TRANSDUCING HEAD WITH MOUNTING AND ADJUSTMENT MEANS

Lawrence H. Gernert, Chatham, N. J., assignor to Monroe Calculating Machine Company, Orange, N. J., a corporation of Delaware Application October 29, 1954, Serial No. 465,565

16 Claims. (Cl. 179—100.2)

This invention relates to magnetic recording and more particularly to magnetic transducing heads and adjustable mountings therefor.

Magnetic recording systems embodying magnetic drums are widely used as data processing equipment. These drums generally comprise a rotating non-magnetic cylinder having a thin magnetizable coating on its periphery. Data is recorded in parallel peripheral channels of the drum in the form of magnetized spots by magnetic transducing heads located in such close proximity to the drum surface that leakage flux at gaps in the heads link therewith. The same heads may be utilized for reproducing recorded data, or, other heads located in other angular positions relative to the drum may be utilized for this purpose. Frequently one or more channels of a drum are used as precession or delay tracks, a pair of transducing heads associated therewith being spaced apart angularly of the drum a distance designed to provide a predetermined time delay between recording of data by one head and reproduction thereof by the other head.

In magnetic drum systems of the sort under discussion critical positional adjustment of the transducing heads radially and angularly of the drum is required for optimum results. For example, optimum recording results may dictate that the heads be spaced .001 inch ±.00025 inch from the surface of the drum.

Transducing head mounts capable of precise bidirectional adjustment are costly and of a bulk not readily accommodated in numbers in the limited space available around a drum. Therefore, it has been proposed to provide a common mount for two or more heads. This arrangement not only reduces the cost and the amount of space consumed but also reduces the time which must be spent in adjusting the heads. However, gang mounting of heads introduces a further problem, namely, alignment of the head surfaces proximate the drum and alignment of the gaps in the heads where they are to be utilized in connection with delay or precession tracks. The former alignment is readily accomplished by grinding the appropriate surfaces of the heads after they have been ganged. The latter alignment, however, is not so readily accomplished, but it cannot be neglected if a predetermined time delay is to be obtained between recording of data by each of two or more ganged heads and reproduction thereof by two or more heads of another gang mount.

The principal object of the invention is to provide a multiple magnetic transducing head structure in which the gaps of the heads are substantially perfectly aligned, and a method of manufacturing the structure to this specification.

Another object of the invention is to provide an adjustable mount for the head structure of the invention which is relatively inexpensive, is of small bulk, and is easy to adjust.

These and other objects and features of the invention will become apparent from the following description when read in the light of the drawings, of which Fig. 1 is an isometric view of a dual head constructed in accordance with the invention;

Figure 1:
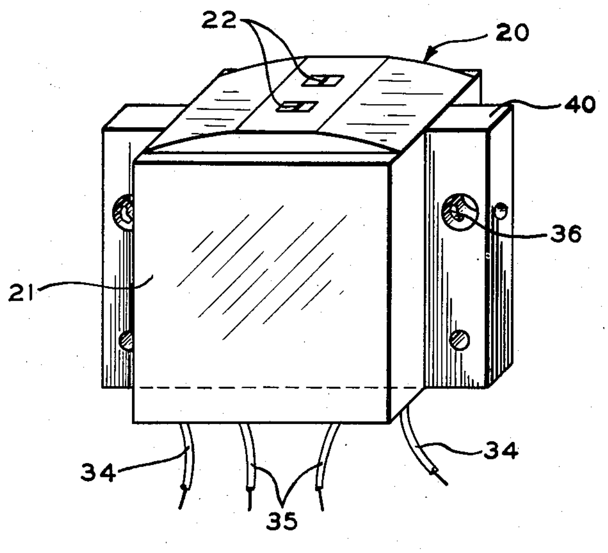

According to the invention, two or more magnetic transducing heads are combined in a common structure which it will be convenient to call a dual head. The number of heads which may be combined in the common structure is not limited to two but for convenience of illustration and description a combination of two heads will be utilized as an example. Referring to Fig. 1 it will be seen that a dual head 20 comprises a plastic cube 21 having a mounting yoke 40 of a non-magnetic material such as aluminum embedded therein and projecting from opposite faces thereof. Twin magnetic transducing structures are also embedded in block 21, one on each side of yoke 40. Each said structure comprises a pair of opposed, approximately C-shaped pole pieces 24 of ferrite or other suitable magnetic material, whose one ends abut and whose other ends are separated by a non-magnetic shim 22 of silver or the like. Serially connected coils 28 are wound on the opposing pole pieces. As indicated in Fig. 1 the shim separated ends of the pole pieces 24 are located flush with the surface of cube 21 for cooperation with a recording medium.

The method of constructing a dual head 20 will now be described.

Initially, the pole pieces 24 are prepared for the coils 28 by wrapping several turns of Japanese tissue impregnated with an appropriate high dielectric adhesive such as Glyptal thereon. Multiple turns of fine copper wire, say 200 turns of No. 42 wire, are then wound on each pole piece to form the coils 28.

Figure 3:
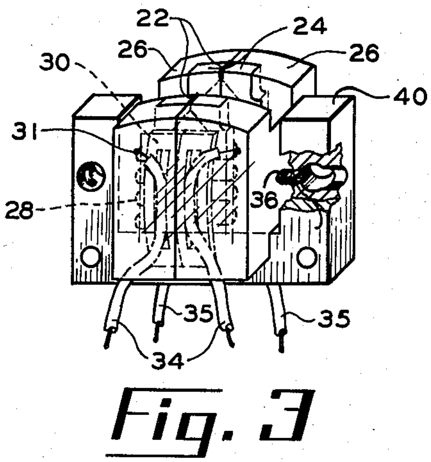
Fig. 3 is an isometric view illustrating another step in the manufacture of the head of Fig. 1.

A pair of pole pieces 24 complete with coils 28 are then placed in a mold 27 with their ends in engagement with the carefully ground surface of a magnet 29 which forms the floor of the mold. The cavity in mold 27 in which the pole pieces are placed comprises a pair of rectangular pole piece receptive sections separated at their ends by carefully located inward extensions 25 of the wall of the cavity. A predetermined spacing between the pole pieces is achieved by pressing the same against opposite sides of the extensions 25. Preferably, this is accomplished by leaf springs 30 compressed between the pole pieces and the appropriate walls of the mold. Insulated leads 34 and 35 are connected to the one end of the coils 28 within the mold so that their ends become embedded with the coils and thereby are anchored to the latter. As best shown in Fig. 3, the springs 30 are provided with longitudinal slots in which the leads 34 engage to more permanently anchor the same and to minimize the bulk of the unit. The other end of the coils are led out of the mold to be available at a later stage in the process.

A suitable plastic such as an epoxy resin is then poured into the mold to form a substantially H-shaped block 26 which houses the components previously placed in the mold. The plastic is then cured, for example, by baking it for twenty-four hours at a temperature of one hundred degrees Fahrenheit. Following this, the H-shaped block is removed from the mold, a proceeding that may be facilitated by coating the inner wall of the mold and the surface of the magnet 29 with a suitable releasing agent such as Dow Corning #7, prior to molding the block.

The next step in the manufacture of a dual head 20 is to mount a pair of H-shaped blocks 26 on the cross piece of a yoke 40 with the ends of the pole pieces 24 in the two blocks facing one another as shown in Fig. 3. Shims 22 are then placed between the opposing pole pieces at the free ends of the blocks 26 and the latter forced toward one another to maintain the said faces in firm contact with the shims and the opposite faces in abutting relationship with one another. Preferably this is accomplished by set screws 36 threaded through the side arms of yoke 40, although, if desired, springs or the like could be utilized.

At this point it is deemed desirable to point out that for optimum results the shims 22 should be of the same size as the opposing pole piece faces which they separate, that is, they should not overlap the edges of said faces.

Next, the two coils 28 of each of the dual transducing structures are connected in series by soldering or otherwise connecting together the ends thereof projecting from the blocks 26 as indicated at 31 in Fig. 3.

Figure 4:
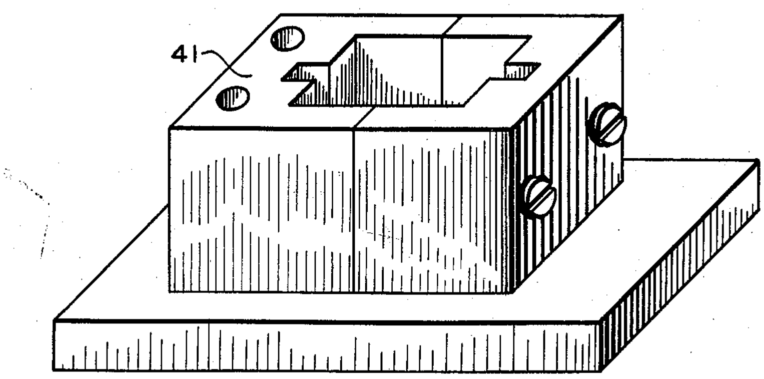
Fig. 4 is an isometric view of a mold used in the manufacture of the head of Fig. 1.
Figure 2:
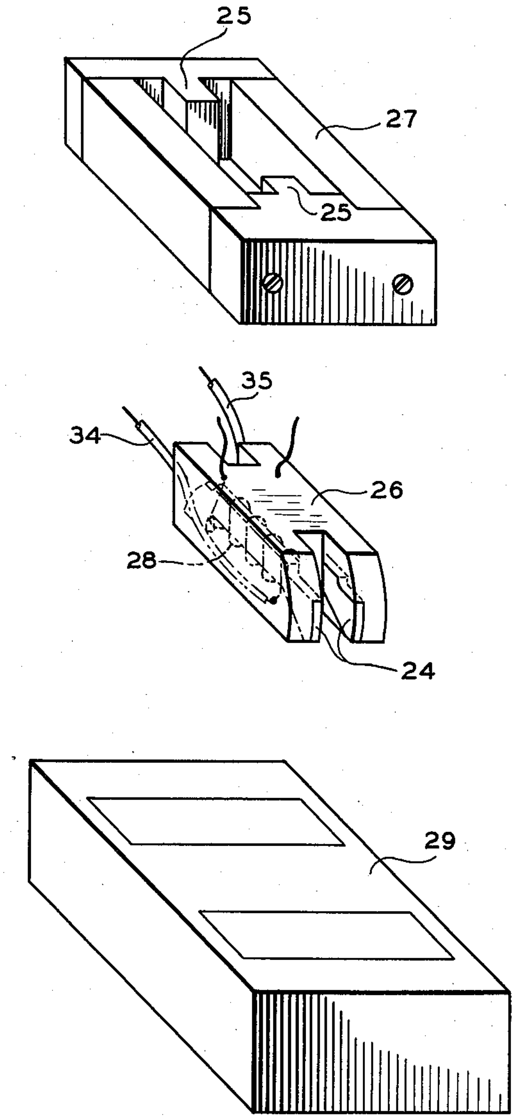
Fig. 2 is an exploded isometric view illustrating a step in the manufacture of the head of Fig. 1.

Finally, the yoke 40 with the blocks 26 secured thereto are placed in a mold 41 (Fig. 4) which is then filled with an epoxy resin to form the block 21 (Fig. 1) which may be cured in the same way as the blocks 26. Preferably the surface of block 21 in which the shim separated ends of the pole pieces are located, and the pole piece ends themselves are ground flush as shown to complete the dual head. It is to be noted that the surface of block 21 in which the shim separated ends of the pole pieces are exposed in somewhat convex. This preferred formation which is achieved by shaping the molds 27 and 41 appropriately facilitates accurate measurement of the spacing between a head and magnetic drum with a feeler gauge or the like.

It will readily be seen, therefore, that the described method produces a dual head whose two gaps (shims 22) are substantially perfectly aligned and which thus can be utilized in conjunction with a pair of precession channels of a drum or the like.

According to the invention, the dual heads 20 are mounted in position for cooperation with a magnetic drum 37 or the like on a bracket 44 or a bracket 45 (Fig. 5) of which the former provides for radial and precessional adjustment of the heads relative to the drum, while the latter provides for radial adjustment only. Brackets 44 and 45 are, in turn, mounted on a yoke 42 which straddles the drum and is secured in any suitable way. As will appear hereinafter a signle yoke 42 may be used to support a plurality of the brackets 44 and 45 on which dual heads 20 are mounted for cooperation with several different channels of the drum.

Figure 5:
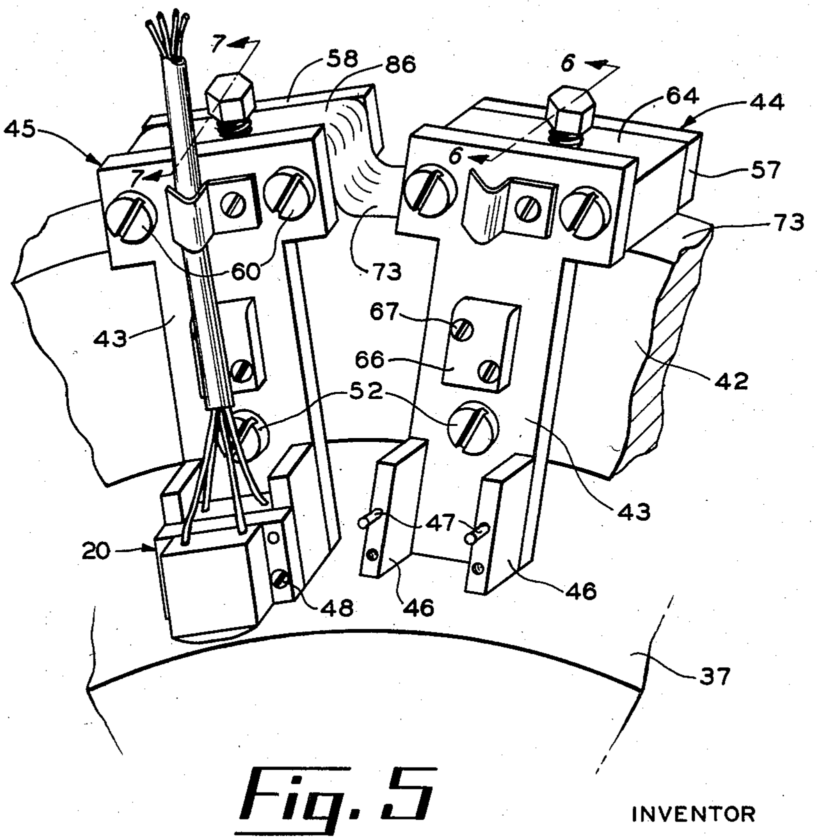
Fig. 5 is a fragmentary isometric view of the adjustable head mounting means of the invention.
Figure 6:
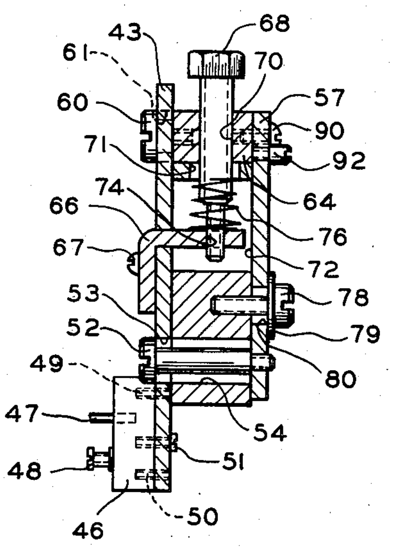
Fig. 6 is a sectional view taken on line 6—6 of Fig. 5.
Figure 8:
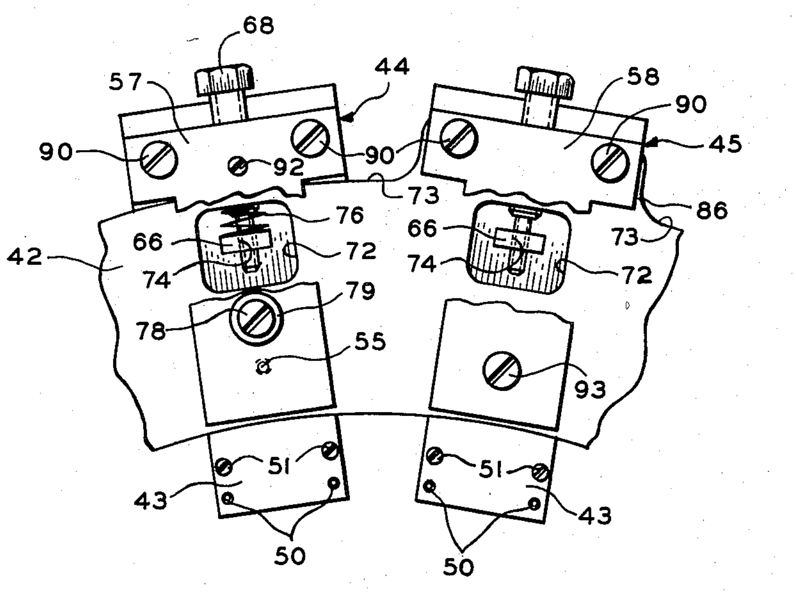
Fig. 8 is an elevational view of the mounting means as seen from behind in Fig. 5.

Referring to Figs. 5, 6 and 8, mounting bracket 44 comprises a T-shaped plate 43 slidably secured aside yoke 42 and extending radially inward from the yoke into close proximity with the drum. Rails 46 secured to the plate at its inner end by pins 49 and 50 and screw 51, and extending away from the yoke 42, provide a mounting for a dual head 20 whose yoke 40 may be fastened thereto by screws 48 and locating pins 47. Rails 46 of various dimensions may be utilized in connection with a plurality of brackets 44 mounted on the same yoke 42 to space the heads 20 mounted thereon differential distances from the yoke. Bracket 44 also includes a T-shaped plate 57 located on the opposite sides of yoke 42 from plate 43 and connected with the latter by a shouldered bolt 52 which passes through a radially extending slot 53 in plate 43 and an oversized hole 54 in the yoke 42 and is threaded into plate 57. Plate 57 is secured to yoke 42 by a screw 78 which is threaded into the yoke a short distance radially outward of the hole 54, through a relatively large hole 80 in the plate. Screw 78 may be provided with a washer 79 to span the hole 80. Plates 43 and 57 are also interconnected at their radially outer ends by a block 64 to which the former is secured by a pair of screws 60 and the latter is secured by a pair of screws 90. Block 64 bears on and is fitted to a dwell 73 in the outer edge of yoke 42 which is substantially concentric with the surface of drum 37. In order to permit of radial movements of the plate 43 relative to block 64, the screws 60 are shouldered and pass through radially extended slots in the plate which are of substantially the same width thereas to minimize angular movement of the plate relative to the drum during radial adjustments. Controlled angular or precessional movement of the plate 43 may be accomplished by sliding the block 64 along the dwell 73, the screws 78 and 52 moving freely in the large apertures 80 and 54 respectively. Screw 78 when tightened locks the bracket against this movement. Preferably the plate 57 has a stud 92 projecting from it near its outer (radial) end for engagement by any suitable fixture adapted to effect accurately controlled precessional movements of bracket 45. For example, the stud may be engaged by a suitable member riding on a finely threaded rotatable screw or worm extending along the line of movement of the stud and journalled in a clamp which may be affixed to yoke 42 in appropriate position by set screws or the like.

In order to effect radial adjustment of the bracket 44 one section of a differential bolt 68 is threaded through a hole 70 in block 64. Bolt 68 also passes through an oversize hole 71 in the dwell 73 into an aperture 72 in yoke 42 wherein its second threaded section engages a threaded hole 74 of an ear 66 which may be integral with plate 43 or merely secured thereto as shown in the drawing. The threads of the two sections of bolt 68 and, therefore, of the holes 70 and 74 are of different pitches and on rotation of the bolt the ear 66 and therefore the plate 43 move a radial distance proportional to the difference in pitch between the two threaded sections of the bolt. Preferably a coiled spring 76 is mounted on bolt 68 between ear 66 and the outer (radially) wall of aperture 72 to urge the said ear and the plate 43 inward toward the drum and thus to retain the same in set position.

Figure 7:
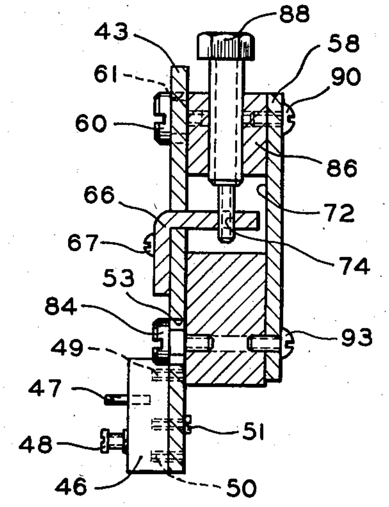
Fig. 7 is a sectional view taken on line 7—7 of Fig. 5.

The bracket 45 which may be utilized where only radial adjustment of a dual head 20 is desired, is similar to the bracket 44 and will be described in detail only insofar as is necessary to point out the ways in which it differs. Referring to Figs. 5, 7 and 8, it will be seen that the bracket 45 includes a plate 43 the same as bracket 44. However, the plate 43 of bracket 45 is not slidably secured to a block 64 adjustably mounted on the outer edge of yoke 42 as is the case with bracket 44, but rather is slidably secured (screws 60 and radial slots 61) to an outwardly extended, integral hump 86 of the yoke 42. No hole 54 in the yoke 42 nor screw 52 is provided in conjunction with bracket 45 but rather, a screw 84 is threaded into the yoke through the slot 53 in plate 43 to permit limited radial movement of the plate but to prevent angular movements thereof. Radial movements of the plate are effected by a differential screw 88 which may be identical with the screw 68 of a bracket 44 but which is threaded through the hump 86 of the yoke 42 rather than through a block 64. The screw 88 serves also to retain the plate 43 in set position, obviating the need for a spring 76 for this purpose. A spring 76 or the like may be provided, however, to eliminate back lash. If desired, bracket 45 may include a second plate 58 similar to the plate 57 of bracket 44 except that it is fixedly secured to yoke 42 by screws 90 and 93.

It will be seen, therefore, that the invention provides a novel magnetic transducing head fabricated in novel manner as well as an adjustable mounting therefor.

While there has been above described but a single embodiment of the invention, many changes therefor and additions thereto can be made without departing from the spirit of the invention and it is not desired, therefore, to limit the scope of the invention except as pointed out in the appended claims or as dictated by the prior arts.

I claim:

1. The combination with a magnetic transducing head of means for supporting the same relative to a magnetic drum comprising, a fixed frame member, a plate having an edge located in close proximity to the surface of the drum and slidably secured to said member, said member having an aperture adjacent said plate, an ear secured to said plate and extending into said aperture, screw means engaging said ear to adjust said plate radially of the drum, and means for securing said head to said plate adjacent the edge nearest the drum.

2. The combination according to claim 1 wherein said screw means comprises a differential screw engaging the said ear and the radially outer wall of said aperture.

3. The combination according to claim 2 wherein the means for securing the head to the plate comprises rails secured to the plate adjacent the edge nearest the drum and extending longitudinally of the drum.

4. The combination according to claim 3 wherein the said screw means comprises a differential screw threaded through said block and said ear, the radially outer wall of said aperture being provided with a slot to accommodate the screw, and including a spring compressed between said ear and said radially outer wall.

5. The combination according to claim 1 wherein the section of the radially outer surface of said member adjacent said plate is substantially concentric with the surface of said drum, and including a block fitted to and slidably mounted on the concentric surface section, said plate being radially slidably secured to said block, the slidable connection between the plate and the member permitting radial and angular adjustment of the plate relative to the drum.

6. The combination according to claim 5 wherein said screw means comprises a differential screw threaded through said block and said ear, the radially outer wall of said aperture being provided with a slot to accommodate the screw, and including a spring compressed between said ear and said radially outer wall.

7. The combination according to claim 6 wherein the means for securing the head to the plate comprises rails secured to the plate adjacent the edge nearest the drum and extending longitudinally of the drum.

8. The combination according to claim 7 wherein a plurality of head supporting means may be mounted on a single said frame member and wherein the rails of each of two or more of said means may extend different distances longitudinally.

9. A dual magnetic transducing head comprising a pair of substantially H-shaped plastic blocks, a pair of approximately C-shaped ferrite pole pieces embedded in each said block with their end faces exposed, a U-shaped member on the crossbar of which said blocks are mounted with one end face of each pole piece of a pair abutting the corresponding face of a pole piece of the other pair, a pair of thin non-magnetic shims each separating the corresponding pole piece faces or a pair of pole pieces, a coil wound on each pole piece, and a plastic block embedding the first said blocks and the inner edges of said U-shaped member.

10. The magnetic transducing head according to claim 9 and including a pair of set screws threaded through the side arms of the U-shaped member to secure the first said blocks on the member prior to embedding them in the last said block.

11. A unit embodying a plurality of magnetic transducing heads each comprising a pair of opposite approximately C-shaped pole pieces having their one end faces abutting and the others separated by a thin non-magnetic shim, in which the shims are substantially perfectly aligned, which comprises a pair of plastic blocks in which the corresponding pole pieces of the heads are embedded with their end faces exposed, said block being provided with aligned channels in the surfaces thereof adjacent the one ends of the pole pieces, a U-shaped yoke having its cross piece engaged in said channel, set screws extending through the side arms of the yoke and engaging said blocks, and a plastic block embedding the first said blocks and at least the inner edge of said yoke, said set screws serving to retain the said blocks in the proper relation on the yoke prior to forming of the last said block.

12. The combination according to claim 11 and including a coil wound on each said pole piece, the one ends of the coils of each pair being connected externally of the first said blocks but internally of the last said block.

13. The combination according to claim 12 and including leads secured to the other ends of said coils within the first said blocks.

14. The combination according to claim 13 and including an arched leaf spring whose ends engage each pole piece and which is provided with a longitudinal slot within and along which a said lead is positioned within the first said block in which the pole piece is embedded, said springs serving to urge the pole pieces to accurately spaced positions prior to forming the first said blocks.

15. The combination with a unit embodying a plurality of magnetic transducing heads each comprising a pair of opposite approximately C-shaped pole pieces having their one end faces abutting and the others separated by a thin non-magnetic shim, in which the shims are substantially perfectly aligned, which comprises a pair of plastic blocks in which the corresponing pole pieces of the heads are embedded with their end faces exposed, said block being provided with aligned channels in the surfaces thereof adjacent the one ends of the pole pieces, a U-shaped yoke having its cross piece engaged in said channel, and a plastic block embedding the first said blocks and at least the inner edge of said yoke; of means for supporting the same relative to a magnetic drum, comprising, a fixed frame member, a plate having an edge located in close proximity to the surface of the drum and slidably secured to said member, said member having an aperture adjacent said plate, an ear secured to said plate and extending into said aperture, screw means engaging said ear to adjust said plate radially of the drum, and means for securing said unit to said plate adjacent the edge nearest the drum.

16. The combination with a unit embodying a plurality of magnetic transducing heads each comprising a pair of opposite approximately C-shaped pole pieces having their one end faces abutting and the others separated by a thin non-magnetic shim, in which the shims are substantially perfectly aligned, which comprises a pair of plastic blocks in which the corresponding pole pieces of the heads are embedded with their end faces exposed, said block being provided with aligned channels in the surfaces thereof adjacent the one ends of the pole pieces, a U-shaped yoke having its cross piece engaged in said channel, and a plastic block embedding the first said blocks and at least the inner edge of said yoke; of means for supporting the same relative to a magnetic drum comprising, a fixed frame member, a plate having an edge located in close proximity to the surface of the drum and slidably secured to said member, said member having an aperture adjacent said plate, an ear secured to said plate and extending into said aperture, screw means engaging said ear to adjust said plate radially of the drum, and a pair of rails secured to the plate adjacent the edge nearest the drum and extending longitudinally of the drum, the side arms of said U-shaped member being secured to said rails.

References Cited in the file of this patent

UNITED STATES PATENTS

| | | |
|---|---|---|
| 2,456,767 | Camras | Dec. 21, 1948 |
| 2,612,681 | Camras | Oct. 7, 1952 |
| 2,721,743 | Erikson | Oct. 25, 1955 |
| 2,756,280 | Rettiner | July 24, 1956 |
| 2,769,866 | Kornei | Nov. 6, 1956 |

UNITED STATES PATENT OFFICE

CERTIFICATE OF CORRECTION

November 18, 1958

Patent No. 2,861,134

Lawrence H. Gernert

It is hereby certified that error appears in the printed specification of the above numbered patent requiring correction and that the said Letters Patent should read as corrected below.

Column 5, line 67, for "faces or" read -- faces of --.

Signed and sealed this 12th day of May 1959.

(SEAL)

Attest:

KARL H. AXLINE
Attesting Officer

ROBERT C. WATSON
Commissioner of Patents